US012690598B1

(12) United States Patent

Gottenbusch

(10) Patent No.: US 12,690,598 B1
(45) Date of Patent: Jul. 28, 2026

(54) SERPENTINE CONVEYOR-BASED DOUGH PROOFING SYSTEM AND METHOD FOR CONTINUOUS BAKING PROCESSES

(71) Applicant: Gary Gottenbusch, Cincinnati, OH (US)

(72) Inventor: Gary Gottenbusch, Cincinnati, OH (US)

( * ) Notice: Subject to any disclaimer, the term of this patent is extended or adjusted under 35 U.S.C. 154(b) by 0 days.

(21) Appl. No.: 19/200,807

(22) Filed: May 7, 2025

(51) Int. Cl.
*A21C 13/02* (2006.01)

(52) U.S. Cl.
CPC .................................... *A21C 13/02* (2013.01)

(58) Field of Classification Search
CPC ...................................................... A21C 13/02
USPC ............................................................ 99/352
See application file for complete search history.

(56) References Cited

U.S. PATENT DOCUMENTS

| | | | | | |
|---|---|---|---|---|---|
| 3,111,913 A | * | 11/1963 | Mladek | ................... | A21C 3/00 |
| | | | | | 425/332 |
| 3,931,759 A | * | 1/1976 | Hayashi | ................ | A21C 13/02 |
| | | | | | 99/468 |
| 5,238,693 A | * | 8/1993 | Walsh | ..................... | A21D 8/02 |
| | | | | | 426/523 |
| 2005/0260319 A1 | * | 11/2005 | Khalaf | .................. | A21C 15/04 |
| | | | | | 426/549 |
| 2017/0055766 A1 | * | 3/2017 | Grimaldi | ................. | H05B 6/60 |

* cited by examiner

*Primary Examiner* — Ibrahime A Abraham
*Assistant Examiner* — Joseph W Iskra
(74) *Attorney, Agent, or Firm* — Jenei LLC

(57) ABSTRACT

A compact serpentine conveyor-based dough proofing system and method for continuous baking processes is disclosed. The system comprises a vertically stacked array of alternating-direction conveyors that guide dough in a serpentine path, enabling extended proofing travel within a compact linear footprint. The dough enters at the top conveyor and sequentially drops through a series of conveyors below, each reversing direction to maximize space efficiency. The system includes an enclosed housing with zoned environmental control, providing warmer, humid conditions at upper levels and cooler, drier conditions at lower levels, optimizing fermentation and dough surface properties. The method allows for continuous dough proofing with precise control over time, temperature, and humidity, accommodating various dough forms such as extruded, braided, or cut strips. The optional features include post-proofing stiffening via refrigeration and pre- or post-proofing caustic treatment. The present invention improves throughput, energy efficiency, and product quality in continuous baking lines.

19 Claims, 2 Drawing Sheets

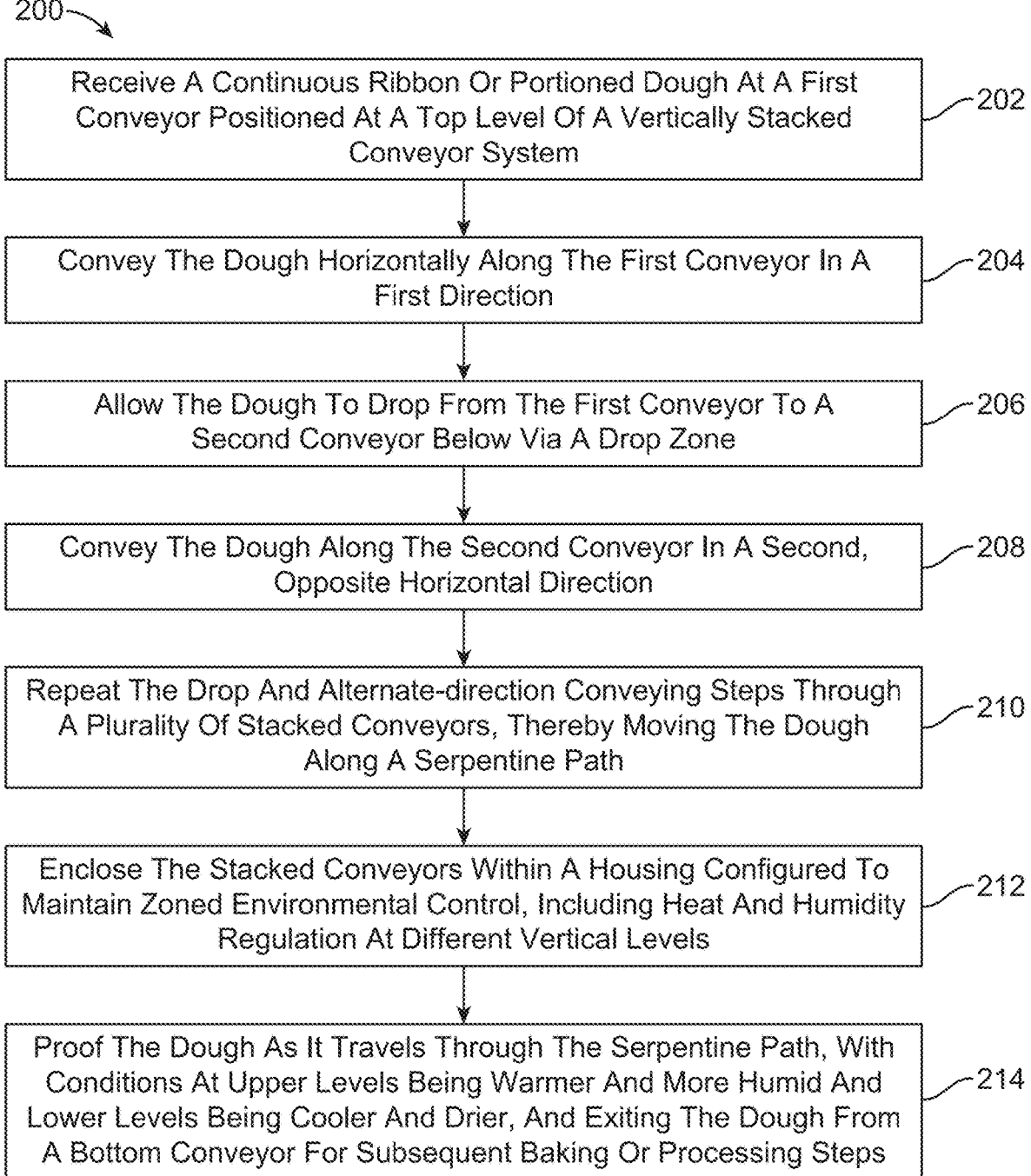

200

Receive A Continuous Ribbon Or Portioned Dough At A First
Conveyor Positioned At A Top Level Of A Vertically Stacked
Conveyor System                                                                    202

Convey The Dough Horizontally Along The First Conveyor In A
First Direction                                                                    204

Allow The Dough To Drop From The First Conveyor To A
Second Conveyor Below Via A Drop Zone                                               206

Convey The Dough Along The Second Conveyor In A Second,
Opposite Horizontal Direction                                                      208

Repeat The Drop And Alternate-direction Conveying Steps Through
A Plurality Of Stacked Conveyors, Thereby Moving The Dough
Along A Serpentine Path                                                             210

Enclose The Stacked Conveyors Within A Housing Configured To
Maintain Zoned Environmental Control, Including Heat And Humidity
Regulation At Different Vertical Levels                                             212

Proof The Dough As It Travels Through The Serpentine Path, With
Conditions At Upper Levels Being Warmer And More Humid And
Lower Levels Being Cooler And Drier, And Exiting The Dough From
A Bottom Conveyor For Subsequent Baking Or Processing Steps                         214

FIG. 2

SERPENTINE CONVEYOR-BASED DOUGH PROOFING SYSTEM AND METHOD FOR CONTINUOUS BAKING PROCESSES

BACKGROUND

1. Technical Field

The present disclosure generally relates to continuous baking systems, specifically to a compact, multi-level serpentine proofing conveyor apparatus for proofing dough products using controlled heat and humidity in a space-saving configuration prior to baking.

2. Description of the Related Art

Conventional dough proofing systems in continuous baking lines are typically long and linear, often requiring up to 400 feet of space to provide sufficient dwell time for dough development. This extensive footprint poses challenges for space optimization in industrial bakeries and limits the flexibility of production line layouts. Additionally, such systems expose a large surface area to ambient conditions, making it difficult to maintain consistent heat and humidity throughout the proofing chamber. This can result in uneven proofing, affecting dough rise, texture, and final baked quality.

Furthermore, existing systems do not efficiently utilize natural heat and humidity dynamics, leading to energy inefficiencies and inconsistent product characteristics. It is also difficult to integrate specific environmental gradients, such as warmer, more humid conditions early in the proofing cycle and cooler, drier conditions later, to optimize dough surface appearance and structure. In systems that involve pre-proofing treatments such as caustic baths, there is limited provision for post-treatment cooling or stiffening, which is often necessary for certain product types like pretzels.

Therefore, there is a need for a more compact, energy-efficient, and controllable proofing system and method that maintains product quality while reducing spatial and operational inefficiencies.

BRIEF SUMMARY

In one aspect, the present disclosure provides a serpentine conveyor system for proofing dough in a continuous baking process. The system comprises a plurality of conveyor belts arranged in vertically spaced, alternating directional layers, wherein a continuous dough ribbon is conveyed in a first direction along a first upper conveyor, then transferred downward onto a second conveyor conveying in a reverse direction, and further transferred downward in alternating forward and reverse directions through subsequent conveyors. The system enables extended proofing length within a minimized linear footprint, maintains a controlled heat and humidity gradient from top to bottom for optimized dough conditioning, and optionally includes a cooling segment post-caustic treatment for dough stiffening.

The system further includes a plurality of conveyors arranged in a vertically stacked and alternating configuration, each conveyor positioned to convey dough in a horizontal direction opposite to the direction of the conveyor immediately above or below it. The system further includes a dough input system configured to deliver a continuous dough stream or discrete dough portions onto a topmost conveyor. The system further includes a plurality of drop zones disposed between adjacent conveyors to allow the dough to descend sequentially from one conveyor to the next in a serpentine path. The system further includes an enclosed housing surrounding the stacked conveyors, the housing comprising one or more environmental control zones configured to regulate temperature and humidity at different vertical levels.

The system further includes at least one controller operatively connected to the conveyors and environmental control zones, configured to control conveyor speed and environmental conditions based on a desired proofing profile. Further, the plurality of conveyors comprises at least ten conveyors, each having a length of approximately 40 feet, thereby enabling a total proofing path of approximately 400 feet within a linear footprint of about 10 feet. The environmental control zones include steam injectors, air movers, and temperature and humidity sensors for creating a thermal and humidity gradient from the topmost conveyor to the bottommost conveyor. The topmost conveyors are configured to operate in a warmer and more humid environment than the bottommost conveyors, to promote initial fermentation and surface conditioning of the dough.

The system further comprises a programmable logic controller (PLC) configured to adjust conveyor speeds and environmental parameters in real-time based on dough type or product recipe. Each conveyor is made of food-grade material and is removably mounted to facilitate cleaning and maintenance. The system further comprises an optional refrigeration section downstream of the proofing system for cooling or stiffening the dough prior to baking or slicing. The drop zones include angled chutes or curved guides to minimize mechanical stress on the dough during vertical transfer between conveyors.

In another aspect, the present disclosure provides a serpentine conveyor method for proofing dough in a continuous baking process. The method comprises the step of: receiving a continuous ribbon or portioned dough at a first conveyor positioned at a top level of a vertically stacked conveyor system; conveying the dough horizontally along the first conveyor in a first direction; allowing the dough to drop from the first conveyor to a second conveyor below via a drop zone; conveying the dough along the second conveyor in a second, opposite horizontal direction; repeating the drop and alternate-direction conveying steps through a plurality of stacked conveyors, thereby moving the dough along a serpentine path; enclosing the stacked conveyors within a housing configured to maintain zoned environmental control, including heat and humidity regulation at different vertical levels, and proofing the dough as it travels through the serpentine path, with conditions at upper levels being warmer and more humid and lower levels being cooler and drier; and exiting the dough from a bottom conveyor for subsequent baking or processing steps.

The method further comprises the step of, passing the dough through a caustic bath either before entering or after exiting the proofing system. The method further comprises the step of, cooling or stiffening the dough with a refrigeration system after proofing, prior to baking or cutting. The proofing environment is further controlled using steam injection and humidity modulation to maintain zoned environmental conditions across the vertical stack. The proofing system is enclosed in an insulated housing to retain thermal and humidity energy and improve consistency.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 2 illustrates a flowchart of a compact serpentine conveyor-based dough proofing method for continuous baking processes, according to an embodiment of the present invention.

DETAILED DESCRIPTION

Figure 1:
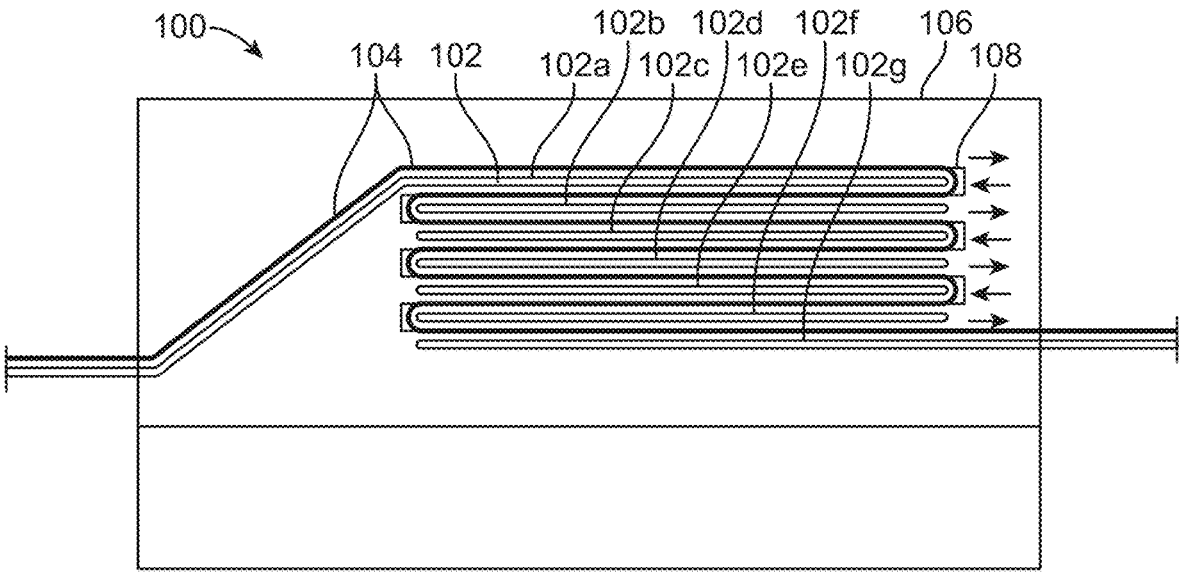
FIG. 1 illustrates a compact serpentine conveyor-based dough proofing system for continuous baking processes, according to one or more embodiments.

The present invention relates to a compact, high-efficiency dough proofing system designed for integration into continuous baking processes. This compact serpentine conveyor-based dough proofing system addresses the need for extended proofing times within confined floor spaces, typical in industrial baking operations. It uses a vertically stacked, serpentine path of conveyor belts enclosed in a zoned, controlled environment to proof a variety of dough forms with consistency, energy efficiency, and process flexibility.

This present invention discloses a serpentine proofing conveyor designed for use in continuous dough baking systems. It incorporates the full range of standard processing steps, from dough mixing to final baking, with a specific focus on the proofing section of the line. The system is compatible with various dough formats, including braids, extruded dough, and strip cuts, making the description generally applicable across methods. Further, depending on the process, the dough cutting may occur before or after the caustic bath. The system utilizes stacked, offset conveyors to create a serpentine path. According to the present invention, the dough travels in a continuous ribbon format as it moves forward on the top conveyor, then drops down to a second conveyor that moves in the opposite direction, and continues in this zigzag fashion through successive layers. Each drop allows the dough to be conveyed in alternating directions. A typical setup may include 3, 4, 5, 6, 7, 8, 9, 10 or more levels, enabling up to 400 feet of proofing path within a compact 10-foot linear footprint.

The key benefits of the present invention are, space efficiency, improved thermal efficiency and optimized proofing conditions. The serpentine configuration maximizes the proofing path within minimal linear space. For instance, 10 conveyor levels at 40 feet each deliver a 400-foot proofing length. Concentrating heat and humidity in a compact volume reduces exposure to ambient conditions, ensuring more consistent and energy-efficient proofing. The natural rise of heat and steam within the vertical stack creates a gradient: warmer, more humid conditions at the upper levels and cooler, drier conditions at the lower levels. This thermal profile enhances dough development and results in a shinier finish post-bake. An optional refrigeration system may be integrated immediately after the caustic wash to cool and stiffen the dough, enhancing handling and downstream performance.

In the present invention, the food items are formed from dough. The dough used in the present invention can be any type of edible dough, including, for example, laminated or non-laminated dough, dough with some sweeteners added, doughs that are leavened, doughs that have been fermented, doughs with flavorings and/or doughs with inclusions or toppings.

The dough useful in the present invention includes those selected from the group consisting of: multi-grain; rice-based; corn-based; rye-based; soda style; wheat-based; butter dough; flavored dough; whole grain-based; cornmeal-based; gluten-free; graham-based; and flatbread style.

The dough useful in the present invention is made according to methods generally known in the art, and includes mixing flour, fat and moisture (ordinarily water) and most often, salt. Optional ingredients, such as flavors, inclusions, colors, nutritional supplements, leavening agents, emulsifiers, etc. may be added as well. The dough may then be sheeted, rolled, or formed according to skill in the art.

The flour component in dough useful in the present invention may be any edible flour, including hard wheat flour, soft wheat flour, corn flour, multi-grain flour, rye flour, rice flour, barley flour, graham flour, whole wheat flour, high amylose flour, low amylose flour, and the like. Different grain constituents lend different texture, taste, and appearance to a baked good. Flours useful herein are of a conventional type and quality including cake flour, bread flour, and all-purpose flour. Wheat flours are preferred but other flours conventionally used in the preparation of baked goods are also employed in full or partial substitution for the wheat flour. One protein range for wheat flour used in the present invention is between about 7 to 15% by weight of the flour. A general all-purpose flour is also usable. This type of all-purpose flour generally comprises a mixture of both hard and soft wheat flours, i.e., both high protein level and low protein level flours. Such flours are useful if the average protein content ranges from about 7 to 15% by weight.

In one or more embodiments, the flour has average protein content range of at most 7, 7, 9, 10, 11, 12, 13, 14, 15% by weight. While chlorinated flours are used herein, unchlorinated flours are also usable because chlorination is an expensive, though unnecessary flour processing step. Unmalted flours may be used provided the flours are derived from wheats with minimal sprout damage. Enzyme inactivated flours are also usable. Flour having low polyphenol oxidase activity, flour having a flour enrichment with all reduced iron, a binder of metal ions, an organic acid, and the like are also usable in the present invention.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not for some other embodiments.

FIG. 1 illustrates a compact serpentine conveyor-based dough proofing system 100 for continuous baking processes, according to one or more embodiments. The compact serpentine conveyor-based dough proofing system 100 comprises a series of ten or more food-grade conveyors 102 mounted in an alternating, stacked configuration. Each conveyor 102 moves the dough 104 horizontally, either forward or in the reverse direction, depending on its position in the stack. The ingredients to make the dough comprising flour and water are placed in a mixer to form and knead the dough. The dough is then placed onto a conveyor, to form the dough into a continuous sheet. Typically a belt of the conveyor is dusted with flour, the dough is added to the belt and the dough is then dusted with flour and rolled into a sheet.

The dough 104 moves along the top conveyor 102a in one direction, then drops to the next conveyor 102b below, which conveys in the opposite direction, and continues this alternating serpentine movement through subsequent conveyors 102c, 102d, 102e, 102f, 102g, and so on, until it exits at the bottom conveyor 102z or the final conveyor in the series. This design enables a long effective proofing distance (for example, 400 feet of travel) within a small linear footprint (for example, 10 feet of factory floor space), significantly reducing the spatial requirements compared to traditional linear proofers.

To maintain consistent fermentation and surface conditioning, the entire conveyor stack (102a, 102c, 102d, and so on) is enclosed within a thermally insulated housing 106. This enclosure supports zoned environmental control, including heat and humidity management. Each zone, typically divided into top, middle, and bottom segments, can be independently managed using steam injectors, air movers, and temperature sensors. The natural rise of heat and moisture is utilized advantageously: the upper levels of the system 100 maintain a warmer and more humid environment suitable for early-stage proofing, while the lower levels progressively transition to a cooler, drier climate. This thermal gradient naturally enhances dough structure 104 and improves surface finish, especially important for products where shine and texture are critical after baking.

In one embodiment, the conveyor belts of the conveyors 102 are powered by synchronized motors, allowing fine-tuned speed control to regulate proofing time. Transfer between each level of the system 100 is facilitated by passive drop zones 108 or curved guide chutes, enabling the dough to gently descend from one level to the next without damaging the structure or alignment. The system 100 can handle a variety of dough types, including, but not limited to, extruded ropes, braided products, strip-cut dough, and other shaped formats. According to the present invention, the system 100 is compatible with both pre- and post-caustic bath stages means it can be integrated seamlessly into the production of pretzels, bagels, and similar specialty baked goods.

A critical aspect of the invention is the method 200 followed for processing dough 104. This method 200 begins with the dough 104 exiting a mixing, extruding, or shaping station and entering the top-level conveyor 102a of the proofing system 100. The dough 104 then moves along this top conveyor 102a through a warm, humid zone ideal for activating yeast and enabling early fermentation. At the end of this belt, it drops vertically onto the next conveyor 102b below. This second conveyor 102b moves the dough 104 in the opposite direction, continuing proofing under slightly less warm and humid conditions. This process repeats, alternating directions and descending level by level through the stacked system 100. Each conveyor layer (102a, 102c, 102d, and so on) introduces dough 104 to a new microclimate, where environmental conditions gradually shift from warm and moist to dry and slightly cooler, improving dough consistency and surface finish as proofing progresses.

According to an embodiment of the present invention, the optional enhancement includes a caustic bath and cooling module, particularly useful for pretzel or bagel production. In such configurations, the dough 104 may pass through a caustic wash either before or after the proofing process. Further, depending on the process, the dough cutting may occur before or after the caustic bath. Following this, an optional refrigeration segment may be used to stiffen the dough 104, ensuring better handling, slicing, or shine prior to baking. This stiffening step may be performed using chilled air systems or refrigerated conveyors 102 adjacent to the proofing system 100.

This serpentine proofing method 200 offers a host of operational advantages. First and foremost, it significantly reduces the floor space required for long-duration proofing, allowing bakeries to increase capacity without expanding their physical footprint. Additionally, the enclosed and zoned design improves energy efficiency by limiting heat and humidity loss and concentrating environmental control only where needed. The built-in thermal gradient created by the vertical structure supports more efficient proofing and improves product finish. It also supports a higher level of automation and process repeatability.

The compact serpentine conveyor-based dough proofing system 100 and method 200 may include integrated monitoring sensors for temperature, humidity, and airflow. These sensors can feed data into a programmable logic controller (PLC) or recipe management system, allowing operators to automate belt speeds and environmental parameters based on product type or batch requirements. The compact serpentine conveyor-based dough proofing system 100 is modular and scalable, additional conveyors can be added to increase total proofing time, or multiple units can be run in parallel to increase throughput. Sanitation and maintenance are facilitated by thoughtful design features. The insulated enclosure includes access panels for cleaning, and each conveyor section is built to be removable or easily accessible for sanitation. Drainage systems direct condensation or washdown water to appropriate outlets, and food-safe materials ensure hygiene standards are maintained throughout.

According to this present invention, the compact serpentine conveyor-based dough proofing system 100 delivers a high-capacity, compact, and energy-efficient dough proofing solution suitable for modern continuous baking lines. The serpentine conveyor layout combined with zoned environmental control allows for long-duration proofing within a small footprint. Its adaptability to different dough types and upstream/downstream processing steps ensures that it can be easily integrated into a wide variety of bakery operations. The method and apparatus together represent a major improvement in both the productivity and quality achievable in continuous dough processing systems.

FIG. 2 illustrates a flowchart of a compact serpentine conveyor-based dough proofing method 200 for continuous baking processes, according to an embodiment of the present invention. At step 202, the method 200 for proofing dough 104 in a continuous baking process using a compact serpentine conveyor system 100 comprises the steps of, receiving a continuous ribbon or portioned dough 104 at a first conveyor 102a positioned at a top level of a vertically stacked conveyor system 100. At step 204, the dough 104 is conveyed horizontally along the first conveyor 102a in a first direction. At step 206, the dough 104 is allowed to drop from the first conveyor 102*a* to a second conveyor 102*b* below via a drop zone 108. At step 208, the dough 104 is conveyed along the second conveyor 102*b* in a second, opposite horizontal direction. At step 210, the drop and alternate-direction conveying steps are repeated through a plurality of stacked conveyors 102, thereby moving the dough 104 along a serpentine path. At step 212, the stacked conveyors 102 are enclosed within a housing 106 configured to maintain zoned environmental control, including heat and humidity regulation at different vertical levels. The proofing environment or system 100 is controlled using steam injection and humidity modulation to maintain zoned environmental conditions across the vertical stack conveyors 102. The proofing system 100 is enclosed in an insulated housing 106 to retain thermal and humidity energy and improve consistency. At step 214, proofing the dough 104 as it travels through the serpentine path, with conditions at upper levels being warmer and more humid and lower levels being cooler and drier; and exiting the dough 104 from a bottom conveyor for subsequent baking or processing steps.

In one embodiment, the multi belt proofer is a series of continuous belts arranged in tiers, over which the sheet of dough passes while the sheet of dough proofs in the proofing room. It has a tier selection capability for adjusting the resting period of an incoming sheet of dough into the proofing room. In one embodiment, the multi belt proofer also comprises a self-aligning belt mechanism to keep the tiered belts perfectly aligned to one another. Alignment of the belts ensures the centerline of the sheet of dough remains consistent throughout the transfer of the sheet of dough through the proofing room.

In one embodiment, the multi belt proofer is located in a room having specific conditions such as a controlled humidity, preferably between 60% to 90% relative humidity, preferably 60% to 80%, more preferably 60% to 75% and typically 70% relative humidity, and relative temperature of between 30° C. and 40° C. In another embodiment, the multi belt proofer is located in a room having controlled humidity of at least 50, 55, 60, 65, 70% or more relative humidity. In another embodiment, the multi belt proofer is located in a room having controlled temperature of at least 30, 31, 32, 33, 34, 35, 36, 37, 38, 39, 40° C. or more. However, it can be appreciated that the leavening requirements will vary depending on the composition of the dough and the above is provided as an example only. The conditions of the proofing room can also vary depending on the ambient or climatic conditions outside the proofing room. For example if the dough is relatively colder than expected when entering the proofing room, the conditions of the proofing room are adjusted to suit. The humidity and warmth of the proofing room also enables the dough to proof, yeast to act and gluten to relax. After proofing, typically for 10 to 40 minutes, the dough is ready to be cut and baked. In one embodiment, the dough is ready to leave the proofing room can be when it has risen by at least 50% to 100%. In one embodiment, the dough has risen at least 50, 55, 60, 65, 70, 75, 80, 85, 90, 95, 100% or more. The rise depends on the makeup of the flour used to make the dough. It can be appreciated that the proofing times may also vary depending on the specific ingredients in the dough, the activity of the yeast, the ambient process conditions outside the proofing room, and the proofing room conditions.

In various embodiments, the dough 104 may remain in a continuous ribbon or be portioned into discrete segments at any point before, during, or after serpentine proofing. Such segmentation, whether performed upstream, midstream, or downstream of the proofing system 100, remains within the scope of the present invention and does not depart from the continuous nature of the proofing process or method 200 as claimed. The system 100 accommodates and is operable with continuous or semi-continuous streams, including dough lengths segmented for handling, transfer, or post-proofing treatments.

In an alternative embodiments, a second proofer, like the first proofer discussed above and illustrated in FIG. 2, is used and comprises a series of conveyor belts arranged so that the elongated dough strips remain substantially continuous and are never transversely cut as they follow a serpentine track through the proofer. Once proofed, the sheet of dough, which can be considered a continuous sheet of dough, is cut into portions, typically by circular slitting blades and transverse cutters, however alternative cutting methods can be used.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure is not limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A serpentine dough proofer system comprising:
a. a stack of at least three conveyors arranged in vertically spaced, alternating-direction layers, each lower conveyor receiving dough from a drop zone at an end of an upper conveyor and conveying in a horizontal direction opposite the upper conveyor;
b. an enclosed housing surrounding the stack and partitioned into at least four vertically distinct environmental control zones;
c. for each zone, a steam injector, an air mover, and both a temperature sensor and a humidity sensor positioned to sense conditions within that zone;

d. a controller operatively coupled to the conveyors and to the steam injectors and air movers of the zones and programmed to maintain a monotonic set-point gradient in which two or more upper zones are controlled to higher temperature and higher humidity than two or more lower zones during proofing, while advancing the dough along the alternating conveyors in a continuous serpentine path, the controller being configured to control conveyor speed and environmental conditions based on a desired proofing profile, and e. a caustic bath unit positioned upstream of a refrigeration section, the refrigeration section being downstream of the enclosed housing and configured for cooling or stiffening the dough prior to baking or slicing.

2. The system of claim 1, wherein the plurality of zones comprises at least four vertically distinct zones, each independently controllable.

3. The system of claim 1, further comprising includes a dough input system configured to deliver a continuous dough stream or discrete dough portions onto the topmost conveyor.

4. The system of claim 1, further comprising includes a plurality of drop zones disposed between adjacent conveyors to allow the dough to descend sequentially from one conveyor to the next in a serpentine path.

5. The system of claim 1, wherein the plurality of conveyors comprises at least ten conveyors, each having a length of 40 feet, thereby enabling a total proofing path of 400 feet within a linear footprint of about 10 feet.

6. The system of claim 1, wherein each environmental control zone includes a respective one of the steam injectors, one of the air movers, one of the temperature sensors, and one of the humidity sensors, such that the environmental control zones collectively create a thermal and humidity gradient from the topmost conveyor to the bottommost conveyor.

7. The system of claim 1, wherein the topmost conveyors are configured to operate in a warmer and more humid environment than the bottommost conveyors, to promote initial fermentation and surface conditioning of the dough.

8. The system of claim 1, wherein the controller is a programmable logic controller (PLC) configured to adjust conveyor speeds and environmental parameters in real-time based on dough type or product recipe.

9. The system of claim 1, wherein each conveyor is made of food-grade material and is removably mounted to facilitate cleaning and maintenance.

10. The system of claim 4, wherein the drop zones include angled chutes or curved guides to minimize mechanical stress on the dough during vertical transfer between conveyors.

11. The system of claim 1, wherein the dough remains a continuous ribbon throughout proofing.

12. A method for proofing dough in a continuous baking process using a compact serpentine conveyor system, the method comprising the steps of:
a. delivering a continuous ribbon of dough to a top conveyor of a vertically stacked, alternating-direction conveyor system;
b. advancing the dough along a serpentine path by sequentially dropping between adjacent conveyors;
c. enclosing the conveyors within plural an enclosed housing partitioned into at least four vertically distinct environmental control zones and sensing temperature and humidity in each zone; and
d. controlling steam injection and airflow per zone with a controller to maintain a monotonic gradient with higher temperature and humidity in two or more upper zones than in two or more lower zones while the dough traverses the serpentine path, the controller being operatively connected to the conveyors and the environmental control zones and configured to control conveyor speed and environmental conditions based on a desired proofing profile; and
e. subjecting the dough to a caustic bath upstream of a refrigeration section and then cooling or stiffening the dough in the refrigeration section located downstream of the enclosed housing prior to baking or slicing.

13. The method of claim 12, wherein the proofing environment is controlled using steam injection and humidity modulation to maintain zoned environmental conditions across the vertical stack.

14. The method of claim 12, further comprising cutting the continuous ribbon of dough into discrete portions after proofing in the serpentine conveyor system and proofing the discrete portions in a second proofing system located downstream of the serpentine conveyor system.

15. The method of claim 12, wherein the dough remains a continuous ribbon throughout proofing.

16. The system of claim 1, further comprising a second proofing system located downstream of the serpentine dough proofer system and configured to receive dough portions cut from the continuous ribbon after proofing in the serpentine dough proofer system.

17. The method of claim 1, wherein advancing the dough along the serpentine path comprises moving the dough through at least about 400 feet of travel within a linear footprint of not more than about 10 feet measured in a primary conveying direction.

18. The system of claim 1, wherein each of the conveyors includes a perforated or mesh belt configured to permit vertical flow of steam and conditioned air between the environmental control zones.

19. The system of claim 1, further comprising a self-aligning belt mechanism configured to maintain alignment between the stacked conveyors and reduce belt mis-tracking during operation.

* * * * *